Dec. 13, 1955  M. R. NICHOLS  2,726,725
PROPELLER SPINNER UTILIZING BOUNDARY CONTROL BY BLOWING
Filed April 7, 1952

INVENTOR.
MARK R. NICHOLS
BY
ATTORNEYS

United States Patent Office 2,726,725
Patented Dec. 13, 1955

2,726,725

PROPELLER SPINNER UTILIZING BOUNDARY CONTROL BY BLOWING

Mark R. Nichols, Newport News, Va.

Application April 7, 1952, Serial No. 281,024

8 Claims. (Cl. 170—135.28)

(Granted under Title 35, U. S. Code (1952), sec. 266)

This invention relates generally to devices and methods of increasing aircraft engine operational efficiency and performance, and particularly to a practical system of maintaining unseparated flow over the spinner of a counter rotating propeller so as to realize a high pressure recovery at the aircraft engine air induction system inlet.

An object of the invention is to provide an improved spinner particularly for a counter rotating propeller, although with slight variation the spinner may be used with a single propeller, the spinner having an air induction entrance preferably at the nose thereof, which is communicated by a diffusing passageway with an air discharge slot, nozzle or other type of port, the latter being directed so that the air passing through the port flows over the surface of the aft portion of the spinner in order to avoid separation of the boundary layer from the spinner surface upstream of the engine induction inlet cowling. This avoidance of flow separation allows high pressure recovery at the engine induction inlet.

Another object of the invention is to teach a new method of boundary layer control over the rear part of a spinner by inducting substantially free-stream total pressure air at the nose of the spinner, diffusing the air and then discharging the air in blast form over a part of the outer surface of the spinner and toward the induction inlet of the engine of the aircraft on which the spinner is mounted.

Figure 1:
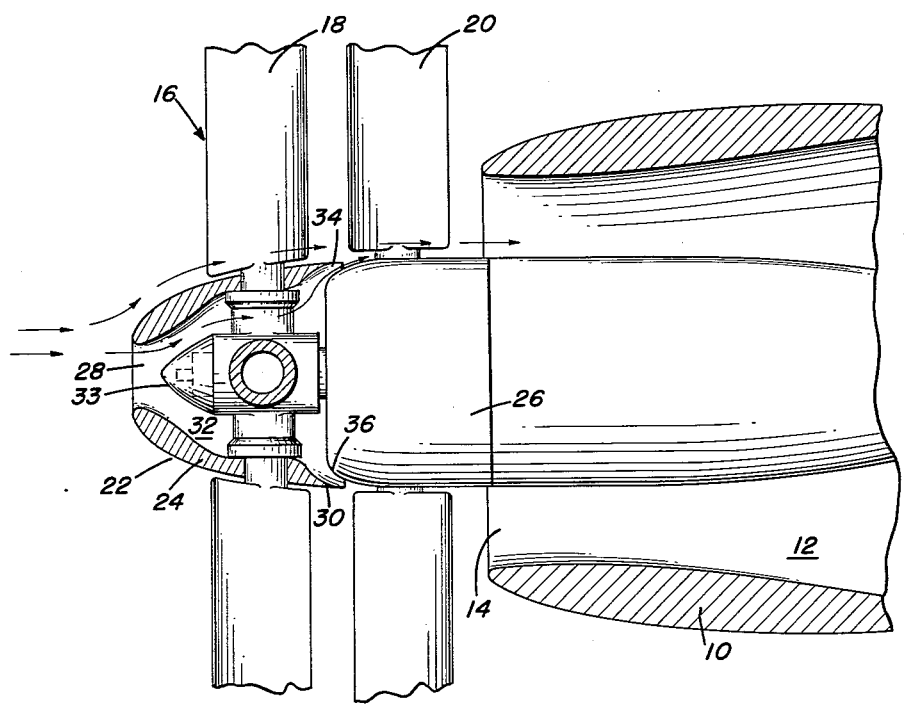

Other objects and features will become apparent in following the description of the drawing, wherein Fig. 1 is a fragmentary view of a conventional engine induction system inlet together with its cowling shown in section, and the improved spinner illustrated partly in section and elevation, the spinner being mounted over the hubs of a counter rotating propeller.

Figure 2:
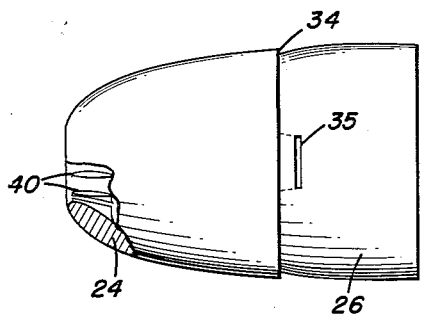

Fig. 2 is an elevational view of a modification of the spinner.

One of the major problems of the cowling-spinner combination for use with counter rotating propellers is that of obtaining a high pressure recovery at the engine induction system inlet. With the usual type of spinner, the length of the spinner ahead of the inlet and the pressure rise through and the disturbances caused by the propeller shanks require the use of a high inlet-velocity ratio in order to avoid separation of the boundary layer from the spinner surface in advance of the cowling inlet. The high inlet-velocity ratio required for such a conventional spinner leads to large and usually unavoidable internal pressure losses. However, the inlet-velocity ratio, and consequently the internal pressure losses, can be reduced by the application of boundary-layer control to the spinner.

Boundary layer control by suction has been tried in the past but is unattractive due to the complexity of the ducting and sealing required to dispose of the low energy air removed from the spinner. Such ducting difficulties are avoided, however, in the present system which uses an air discharge port in the form of a nozzle, slot or the like to re-energize the boundary layer on the spinner.

Referring to the drawing, there is a conventional cowl 10 defining an air passage 12 having an engine induction system inlet 14 at the front end thereof. The air passage 12 leads to any type of conventional aircraft engine which may be used to rotate a typical counter rotating propeller assembly 16 including propellers 18 and 20, each of which has a hub and other standard equipment.

The spinner 22 for the propeller assembly 16 is composed of a front and rear member, 24 and 26 respectively, the front member 24 being provided with apertures through which the blade shanks of propeller 18 pass, and the rear member 26 being provided with apertures used for the shanks of the blades of propeller 20. The front spinner member 24 is made of a properly contoured substantially annular wall which tapers inwardly toward a frontal air entrance opening 28, and which reduces in thickness at its rear part 30. A passageway 32 defined by the inner surface of the wall of the member 24 and the outer surface of the fairing 33, and serving as a diffuser, communicates the entrance 28 with one or more air discharge ports 34 at the rear end of the spinner member 24 and at the front end of the spinner member 26.

Spinner member 26 has a smoothly contoured front edge 36 which cooperates with the rear part 30 of the wall of spinner member 24 to form the port 34 illustrated in Figs. 1 and 2. This port may be of any suitable configuration such as a slot or nozzle. However, the port is so constructed that the air discharge is directed along the outer surface of the spinner member 26 toward the engine induction inlet 14.

In operation the entrance 28 inducts the required amount of boundary-layer-control air at approximately the free-stream total pressure and after being diffused by flowing through the diffuser passageway 32 to reduce the internal losses, the air passes through the discharge port 34, situated between the front and rear spinner members and slightly upstream of the rear propeller 20 roots. The front spinner member 24 has a relatively blunt nose which renders it fairly insensitive to changes in angle of attack. Inasmuch as the surface pressures at the maximum diameter station of the type of inlet under consideration approach the free stream static pressure, adequate pressure drop across the boundary-layer-control port 34 is available when the port 34 is located in the position shown despite both the pressure rise through the front propeller 18 and the low velocity field immediately in front of the inlet 28. As the angle of attack is increased the surface pressures at the top of the port 34 decrease, thereby increasing the available pressure drop across this part of the port and increasing the effectiveness of the boundary-layer-control at the top of the spinner assembly 22 where increasing the angle of attack also tends to make the boundary layer more susceptible to separation. This characteristic makes the blowing of an air blast much more desirable than the use of suction for boundary layer control, inasmuch as increasing the angle of attack in the case of suction usage decreases the pressure differential across this critical portion of the port 34.

As the air is discharged from the port 34 in a continual blast, it flows along the surface of the spinner member 26 reenergizing the boundary layer whereby flow separation and the attendant turbulance is avoided. Accordingly, the ultimate pressure recovery at the inlet 14 is high permitting a decrease in specific fuel consumption and an increase in maximum available engine power. The spinner 22 is particularly applicable to aircraft engine installations utilizing large spinners and should be of maximum value in the case of long range, high speed, turbine powered aircraft utilizing counter rotation propellers. But, when applied to a single propeller, the spinner would be identical to that shown at 22 except the front spinner member 24 would be fastened to the rear spinner member 26 (Fig. 2) and the front spinner member would not have propeller shank receiving apertures.

In the case where more than one port 34 is used, the boundary layer air may be discharged at several locations, as at 35, along the length of the spinner member 26 in Fig. 2 and thereby permit the use of a lower inlet velocity ratio than is the case with the single port 34. Moreover, the port area may be made variable by means known in the art. Also, axial or centrifugal blower blades 40 may be installed in the passageway 32 in order to increase the rate and pressure of the internal flow. Other variations as fall within the scope of the following claims may be made without departing from the invention.

The invention described herein may be manufactured and used by or for the Government of the United States of America for governmental purposes without the payment of any royalties thereon or therefor.

What is claimed is:

1. In combination with a counter rotating propeller assembly having a first and a second propeller, each being provided with a hub, a first spinner mounted on one of the hubs and a second spinner mounted on the other hub, said spinners being spaced from each other to thereby define a port between the spinners and upstream of one of the propellers, and said first spinner having a frontal air entrance to receive air for discharge through said port adjacent to the outer surface of said second spinner so as to modify the flow of boundary layer air contiguous to said second spinner.

2. In an aircraft having an engine induction system air inlet and a counter rotating propeller assembly in advance of said inlet, means for increasing ultimate pressure recovery at said inlet comprising a spinner for said propeller assembly, said spinner having an air discharge port situated between the propellers to direct an air blast over the surface of a part of said spinner and toward said inlet.

3. In an aircraft having an engine induction system air inlet and a counter rotating propeller assembly in advance of said inlet, means for increasing ultimate pressure recovery at said inlet comprising a spinner for said propeller assembly, said spinner having an air discharge port situated between the propellers to direct an air blast over the surface of a part of said spinner and toward said inlet to prevent separation of the boundary layer from the spinner in advance of said air inlet, and said spinner being provided with a frontal air entrance to receive air to be discharged through said port.

4. An aircraft propeller spinner comprising a first spinner member, a second spinner member in advance of said first spinner member and fitting over a part of the front of said first member, said spinner members having confronting spaced portions defining an air discharge port directed over the surface of said spinner member, said second spinner member having a free airstream air entrance in communication with said port, and means for diffusing the air as it passes from said entrance to said port.

5. In an aircraft provided with an engine induction inlet and counter rotating propellers disposed upstream of the engine induction inlet, the improvement comprising means for enhancing pressure recovery at the induction inlet to thereby increase engine operational efficiency, said means including a front spinner member and a rear spinner member for the counter rotating propeller, said front spinner member having a frontal air entrance and an air passageway communicating therewith, said front spinner member having a wall, the rear portion of which is longitudinally spaced from the front end of said rear spinner member thereby forming an air discharge port through which air from said passageway passes, and said wall rear portion being arranged to direct the air passing through said port over the outer surface of said rear spinner member in order to avoid separation of the boundary layer from said rear spinner member.

6. The combination of claim 5 and the counter rotating propeller having a propeller nose fairing located in said front spinner member and spaced from the inner surface of another part of said wall to form a portion of said passageway.

7. An aircraft propeller spinner as in claim 4, said port being arranged to direct an air blast rearwardly of said second spinner member and closely contiguous to the surface of said first spinner member so as to maintain unseparated flow over said spinner, said free airstream air entrance being in advance of said port.

8. An aircraft propeller spinner as in claim 4, said spinner having said free airstream air entrance in advance of said port, and said diffusing means comprising a diffuser passageway in said spinner.

References Cited in the file of this patent

UNITED STATES PATENTS

| | | |
|---|---|---|
| 1,611,658 | Magni | Dec. 21, 1926 |
| 2,206,417 | Mercier | July 2, 1940 |
| 2,482,720 | Sammons | Sept. 20, 1949 |
| 2,609,054 | Geyer et al. | Sept. 2, 1952 |
| 2,622,688 | Lee | Dec. 23, 1952 |